Patented Apr. 12, 1938

2,113,945

UNITED STATES PATENT OFFICE 2,113,945

PREPARATION OF PURE TITANIUM DIOXIDE

Walter W. Plechner, Piney River, Va., and Arthur W. Hixson, Leonia, N. J., assignors to National Lead Company, New York, N. Y., a corporation of New Jersey No Drawing. Application November 23, 1934, Serial No. 754,464

13 Claims. (Cl. 23—202)

Our present invention generally relates to titanium oxide pigments having improved properties, and more specifically to a novel method of producing a pigment of this type.

It is believed that the hiding power of a pigment is some function of the refractive index among other properties; the greater the difference between the refractive index of the pigment and that of the vehicle in which it may be suspended the greater will be the hiding power of the pigment. In this way is partially explained the relatively high hiding power of the titanium pigments. Thus the refractive indices of a few of the common white pigments are:

| | |
|---|---|
| Titanium dioxide (anatase) | 2.55 |
| Zinc sulphide | 2.37 |
| Lead basic carbonate | 1.99 |
| Zinc oxide | 1.90 |
| Blanc fixe | 1.64 |
| Linseed oil | 1.49 |

Titanium dioxide which has hitherto been commercially prepared has always been precipitated by the hydrolysis of sulphuric acid solutions of titanium, and, as has been shown by Weiser and Milligan: J. Phys. Chem. 38, 513 (1934), such an oxide always exists as the anatase modification which has the refractive index indicated in the above tabulation.

It has been long known that the refractive index of the rutile modification of titanium dioxide is 2.71, and, therefore, if titanium dioxide could be so precipitated as to form rutile on calcination, and, furthermore, if the precipitation conditions, or "hydrolysis conditions" as it is frequently called in the art, were such as to form particles which on calcination were suitable for pigment purposes, a new white pigment far superior in hiding power to the pigment grade titanium oxides now commercially available would have been obtained.

It, also, was shown by Weiser and Milligan in the publication cited above that when titanium dioxide is precipitated from a chloride solution the rutile modification is always obtained. Titanium dioxide has not been prepared under such conditions in the past because until the time of our discovery it was not known how to precipitate the oxide from a chloride solution and obtain the other properties, (purity, whiteness, proper particle size, filterability, etc.), necessary for the production of a material suitable for pigment purposes. Titanium dioxide which has been precipitated from chloride solutions by others has usually been in a peptized, or extremely finely divided, condition, and, therefore, has been extremely difficult to filter and impossible to wash free from impurities contained in the mother liquor. This extreme fineness of particle size and difficulty in washing has resulted in calcined products of very poor color and very low hiding power, entirely unsuitable for use as a pigment.

We have discovered that under suitable conditions, to be disclosed below, titanium dioxide adapted to pigment uses can be precipitated from a titanium chloride solution. Furthermore, pigment so obtained shows a remarkably improved tinting strength and hiding power over titanium oxide pigments hitherto offered in the trade. Thus, if tinting strength is determined by the tentative method of test of the American Society of Testing Materials, A. S. T. M. Designation: D332—31T, A. S. T. M. Tentative Standards 1933, 525, the highest value shown by old commercial products is about 1100-1200, whereas our pigment gives values of 1400-1500. The hiding power of our form of titanium dioxide is correspondingly greater. We now ascribe this to the fact that our pigment is in the rutile modification since it is precipitated from a chloride solution, and has, therefore, a higher refractive index than the ordinary titanium dioxide pigment.

It may be stated, therefore, that it is one of the primary objects of the present invention to provide a titanium oxide compound which possesses tinting strength and hiding power greatly improved over similar types of pigments hitherto used, and which compound is readily derived from a titanium chloride solution.

We have discovered that titanium dioxide may be precipitated from a chloride solution in a form highly suitable for use as a pigment if the precipitation, or hydrolysis, is carried on under such conditions as to give relatively rapid precipitation in the presence of coagulants which prevent the well-known peptizing action of the chloride ion. Such suitable conditions involve the addition of relatively concentrated aqueous solutions of titanium tetrachloride to a boiling solution of water containing a very small amount of coagulant. We have found that negative divalent ions, as for example oxalate, tartrate or sulphate, behave as coagulants and cause the hydrous titanium oxides to be precipitated in a readily filterable and easily washed state, and when so precipitated the titanium dioxide obtained after calcination has remarkably high hiding power and tinting strength and is comparable in all other respects to the titanium pigments previously available.

Hence, it is pointed out that another important object of the invention is to provide titanium dioxide in the rutile modification, the compound being in a non-peptized state and being characterized by its readily filterable condition.

Another advantage of our process is that the titanium oxide prepared by our method is of unique purity. We have not been able to detect any impurities in our product by any chemical means known to us. On the other hand titanium oxides precipitated from sulphuric acid solutions analyze about as follows:

| | Per cent |
|---|---|
| Titanic oxide | 98.3 –99.2 |
| Sulphuric anhydride | 0.01– 0.61 |
| Ferric oxide | 0.01– 0.02 |
| Phosphoric anhydride | 0.19– 0.31 |
| Water soluble | 0.23– 0.62 |

In order that our method of preparation of pure titanium dioxide in the rutile modification may be more readily understood we give an example in detail, although we do not wish to be limited thereto. It is to be further understood that the following detailed disclosure of the mode of practising our invention is addressed to those skilled in the art of preparing titanium oxide pigments; such skilled persons are fully aware of the apparatus and manipulations usually utilized in the art of preparing titanium compounds.

Titanium tetrachloride is obtained by the chlorination under reducing conditions of titaniferous materials. The operation may be carried out so as to yield titanium chloride containing but relatively small amounts of impurities. The titanium tetrachloride is then dissolved in two volumes of cold water yielding a clear aqueous chloride solution of titanium containing about 15 per cent titanium oxide. All the iron present is reduced to the ferrous condition in order to prevent the hydrolysis which ferric salts readily undergo. This reduction may be accomplished by any of the known methods, such as by the introduction of metallic zinc. In order to insure the absence of ferric iron throughout the precipitation, we prefer to reduce the solution to a content of two to three grams per liter of titanium oxide in the titanous state.

Having 1000 pounds of chloride solution containing 15 per cent titanium oxide, this is added to 10,000 pounds of boiling water containing 10 pounds of oxalic acid during about one hour. When the addition has been completed about 95 per cent of the titanium will have been precipitated as hydrous titanium dioxide; the latter is in a coagulated form such that it settles well and may be readily filtered and washed. After filtration and washing the precipitate is converted to the anhydrous rutile form by calcining at a temperature of from 700° to 1000° C.

While in the above example oxalic acid has been used as the coagulant any substance dissociating so as to produce a divalent negative ion in aqueous solution, sulphuric acid for example, may be used. Tartaric acid, in addition to the oxalic and sulfuric, dissociates so as to produce a divalent negative ion in aqueous solution and at the same time is compatible with the strongly acid solution used. Solutions of these acids, most conveniently the alkali solution, e. g., sodium sulfate $Na_2SO_4$, sodium oxalate $Na_2C_2O_4$, sodium tartrate $Na_2C_4H_2O_6$ etc., may be used.

It will be understood that the aforegoing specific description is but illustrative of a typical embodiment of our invention, and that various changes may be made in the various ingredients, steps, temperatures, quantities of the process, and the uses of the resulting product, without departing from the spirit of the invention as set forth in the following claims.

What we claim is:

1. Process for the preparation of pure titanium dioxide having rutile crystalline structure which comprises hydrolytically precipitating non-peptized, easily filterable, hydrous titanium oxide from an aqueous titanium tetrachloride solution containing a small amount of a negative, divalent coagulating ion, separating the said hydrous titanium oxide and calcining it to rutile crystalline structure.

2. Process for the preparation of pure titanium dioxide having rutile crystalline structure which comprises adding an aqueous solution of titanium tetrachloride to hot water containing a small amount of a negative, divalent coagulating ion, heating the mixed solutions to hydrolytically precipitate non-peptized hydrous titanium oxide in readily filterable form, separating the so obtained hydrous titanium oxide and calcining it to rutile crystalline structure.

3. Process for the preparation of pure titanium dioxide having rutile crystalline structure which comprises hydrolytically precipitating non-peptized, easily filterable hydrous titanium oxide from an aqueous solution of titanium tetrachloride containing a small amount of a coagulant selected from the group consisting of the acids and alkali metal salts of the sulfate, tartrate and oxalate radicals, separating the said hydrous titanium oxide and calcining it to rutile crystalline structure.

4. Process for the preparation of pure titanium dioxide having rutile crystalline structure which comprises adding an aqueous solution of titanium tetrachloride to hot water containing a small amount of a coagulant selected from the group consisting of the acids and alkali metal salts of the sulfate, tartrate and oxalate radicals, heating the mixed solutions to hydrolytically precipitate non-peptized hydrous titanium oxide in readily filterable form, separating the so obtained hydrous titanium oxide and calcining it at a temperature between 700° C. and 1000° C. to rutile crystalline structure.

5. Process for the preparation of pure titanium dioxide having rutile crystalline structure which comprises adding an aqueous solution of titanium tetrachloride to hot water containing a small amount of a coagulant selected from the group consisting of the acids and alkali metal salts of the sulfate, tartrate and oxalate radicals, heating the mixed solutions to hydrolytically precipitate non-peptized hydrous titanium oxide in readily filterable form, separating the so obtained hydrous titanium oxide and calcining it at a temperature between 700° C. and 1000° C. to form a product possessing rutile crystalline structure, a tinting strength between 1400 and 1500 as determined by A. S. T. M. method D332—31T, covering power, whiteness, particle size, and brightness rendering said product adaptable for pigment uses.

6. Process for the preparation of pure titanium dioxide having rutile crystalline structure which comprises adding an aqueous solution of titanium tetrachloride to hot water containing a small amount of the sulfate ion, heating the mixed solutions to hydrolytically precipitate non-peptized hydrous titanium oxide in readily filterable form, separating the so obtained hydrous titanium oxide and calcining it at a temperature between 700° C. and 1000° C. to rutile crystalline structure.

7. Process for the preparation of pure titanium dioxide having rutile crystalline structure which comprises adding an aqueous solution of titanium tetrachloride to hot water containing a small amount of the tartrate ion, heating the mixed solutions to hydrolytically precipitate nonpeptized hydrous titanium oxide in readily filterable form, separating the so obtained hydrous titanium oxide and calcining it at a temperature between 700° C. and 1000° C. to rutile crystalline structure.

8. Process for the preparation of pure titanium dioxide having rutile crystalline structure which comprises adding an aqueous solution of titanium tetrachloride to hot water containing a small amount of the oxalate ion, heating the mixed solutions to hydrolytically precipitate nonpeptized hydrous titanium oxide in readily filterable form, separating the so obtained hydrous titanium oxide and calcining it at a temperature between 700° C. and 1000° C. to rutile crystalline structure.

9. In a process for the preparation of pure titanium dioxide having rutile structure which includes hydrolytic precipitation of hydrous titanium oxide from an aqueous titanium tetrachloride solution, the step which consists in heating an aqueous titanium tetrachloride solution containing a small amount of a coagulating negative, divalent ion to hydrolytically precipitate non-peptized, readily filterable hydrous titanium oxide.

10. In a process for the preparation of pure titanium dioxide having rutile structure which includes hydrolytic precipitation of hydrous titanium oxide from an aqueous titanium tetrachloride solution, the step which consists in heating an aqueous titanium tetrachloride solution containing a small amount of a coagulant selected from the group consisting of the acids and alkali metal salts of the sulfate, tartrate and oxalate radicals to hydrolytically precipitate non-peptized, readily filterable hydrous titanium oxide.

11. In a process for the preparation of pure titanium dioxide having rutile structure which includes hydrolytic precipitation of hydrous titanium oxide from an aqueous titanium tetrachloride solution, the step which consists in heating an aqueous titanium tetrachloride solution containing a small amount of the sulfate ion to hydrolytically precipitate non-peptized, readily filterable hydrous titanium oxide.

12. In a process for the preparation of pure titanium dioxide having rutile structure which includes hydrolytic precipitation of hydrous titanium oxide from an aqueous titanium tetrachloride solution, the step which consists in heating an aqueous titanium tetrachloride solution containing a small amount of the tartrate ion to hydrolytically precipitate non-peptized, readily filterable hydrous titanium oxide.

13. In a process for the preparation of pure titanium dioxide having rutile structure which includes hydrolytic precipitation of hydrous titanium oxide from an aqueous titanium tetrachloride solution, the step which consists in heating an aqueous titanium tetrachloride solution containing a small amount of the oxalate ion to hydrolytically precipitate non-peptized, readily filterable hydrous titanium oxide.

WALTER W. PLECHNER.
ARTHUR W. HIXSON.